(12) United States Patent
Kitanosako

(10) Patent No.: US 11,023,030 B2
(45) Date of Patent: Jun. 1, 2021

(54) ELECTRONIC DEVICE AND CONTROL METHOD THEREOF

(71) Applicant: CANON KABUSHIKI KAISHA, Tokyo (JP)

(72) Inventor: Hiroki Kitanosako, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/235,233

(22) Filed: Dec. 28, 2018

(65) Prior Publication Data

US 2019/0204895 A1 Jul. 4, 2019

(30) Foreign Application Priority Data

Dec. 28, 2017 (JP) .............................. JP2017-254577

(51) Int. Cl.
| | | |
|---|---|---|
| *G06F 1/00* | (2006.01) | |
| *G06F 1/3206* | (2019.01) | |
| *G06F 13/38* | (2006.01) | |
| *G06F 1/26* | (2006.01) | |
| *G06F 13/42* | (2006.01) | |

(Continued)

(52) U.S. Cl.
CPC ............ *G06F 1/3206* (2013.01); *G06F 1/266* (2013.01); *G06F 13/385* (2013.01); *G06F 13/4295* (2013.01); *H02J 7/0068* (2013.01); *G06F 1/30* (2013.01)

(58) Field of Classification Search
CPC ...... G06F 1/3206; G06F 1/266; G06F 13/385; G06F 13/4295; H02J 7/68
USPC ....................................................... 713/340
See application file for complete search history.

(56) References Cited

U.S. PATENT DOCUMENTS

| | | | | |
|---|---|---|---|---|
| 5,773,960 A | * | 6/1998 | Ueda ..................... | H02J 7/0031 |
| | | | | 320/127 |
| 2003/0141123 A1 | * | 7/2003 | Sugiura ................... | B60L 7/14 |
| | | | | 180/65.25 |

(Continued)

FOREIGN PATENT DOCUMENTS

| | | |
|---|---|---|
| EP | 2930588 A1 | 10/2015 |
| JP | 2003-280771 A | 10/2003 |
| JP | 2012-185661 A | 9/2012 |

OTHER PUBLICATIONS

Universal Serial Bus Type-C Cable and Connector Specification, USB 3.0 Promoter Group, Jul. 14, 2017, Release 1.3, 27 Pages (total).

(Continued)

*Primary Examiner* — Volvick Drose
(74) *Attorney, Agent, or Firm* — Cowan, Liebowitz & Latman, P.C.

(57) ABSTRACT

An electronic device includes a power receiving unit that receives power from a power supply apparatus, a type determination unit that determines a type of the power supply apparatus, a capability determination unit that determines a power supply capability of the power supply apparatus, and a control unit. The control unit limits or stops power to be received from the power supply apparatus if the type of the power supply apparatus is determined to be a first type and the power supply capability of the power supply apparatus is determined to be a second power supply capability higher than a first power supply capability that corresponds to the first type.

20 Claims, 5 Drawing Sheets

(51) Int. Cl.
*H02J 7/00* (2006.01)
*G06F 1/30* (2006.01)

(56) References Cited

U.S. PATENT DOCUMENTS

| | | | |
|---|---|---|---|
| 2005/0174710 A1* | 8/2005 | Masui | G06F 1/266 361/92 |
| 2009/0077393 A1* | 3/2009 | Nakamura | G06F 1/26 713/310 |
| 2009/0111532 A1* | 4/2009 | Salokannel | H04W 52/0219 455/574 |
| 2012/0104853 A1* | 5/2012 | Yasuda | H04L 12/10 307/43 |
| 2014/0112036 A1* | 4/2014 | Chen | H02H 3/085 363/53 |
| 2014/0198337 A1* | 7/2014 | Nakajima | G03G 15/5004 358/1.14 |
| 2015/0293514 A1* | 10/2015 | Tupala | G01R 19/16595 700/295 |
| 2016/0020619 A1* | 1/2016 | Ma | H01M 10/488 320/134 |
| 2016/0188514 A1 | 6/2016 | Forghani-Zadeh et al. | |
| 2017/0163055 A1* | 6/2017 | Ko | H02J 7/0026 |
| 2017/0293335 A1 | 10/2017 | Dunstan et al. | |
| 2017/0364114 A1 | 12/2017 | Sporck et al. | |
| 2018/0060201 A1 | 3/2018 | Newberry | |
| 2018/0129260 A1 | 5/2018 | Tseng et al. | |
| 2018/0267586 A1 | 9/2018 | Jung et al. | |

OTHER PUBLICATIONS

The above patent document was cited in a European Search Report dated Jun. 4, 2019, which is inclosed, that issued in the corresponding European Patent Application No. 18214342.0.

* cited by examiner

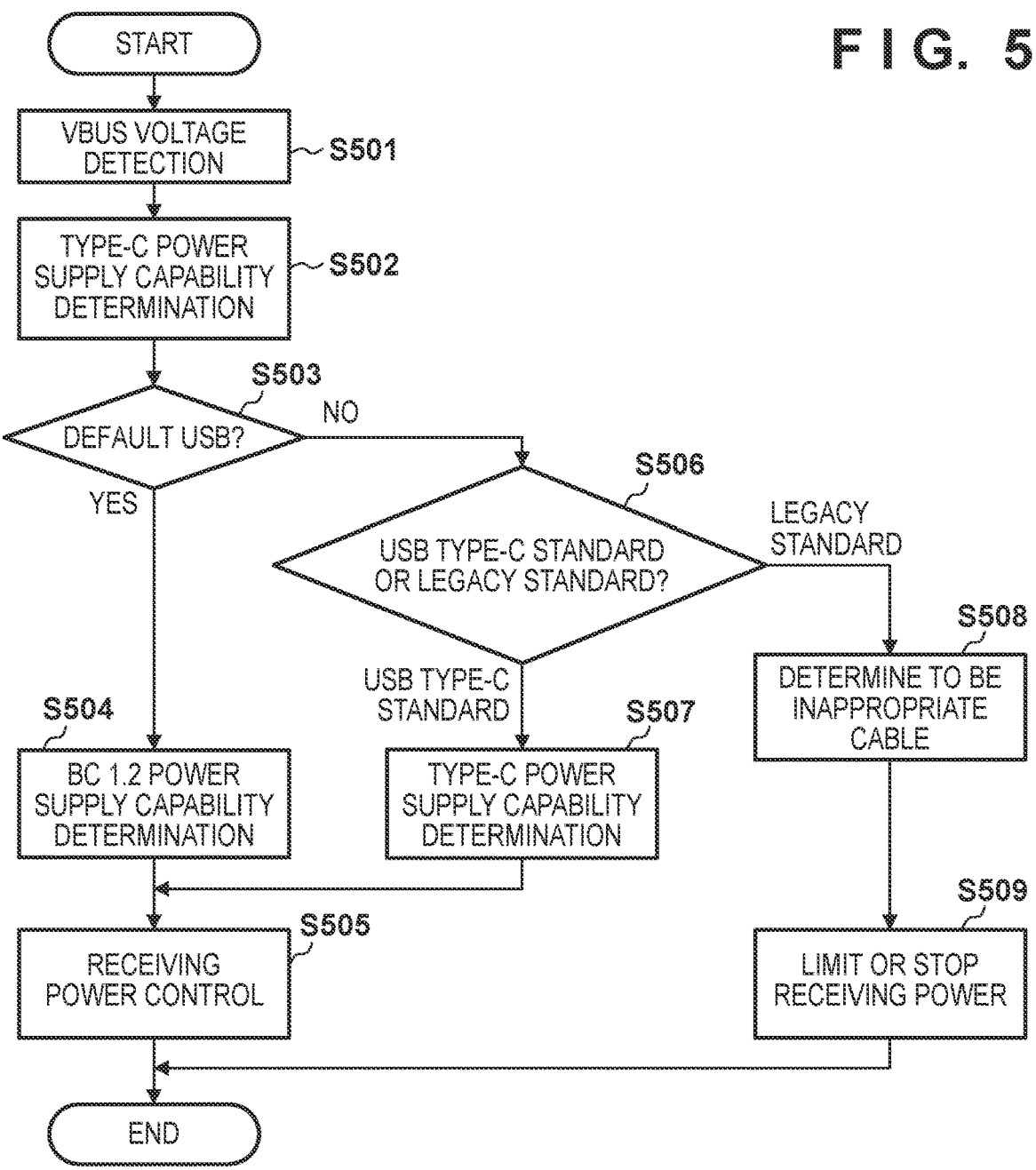

ELECTRONIC DEVICE AND CONTROL METHOD THEREOF

BACKGROUND

Field of the Invention

Aspects of the disclosure generally relate to an electronic device that can receive power from a power supply apparatus via a cable, and a control method thereof.

Description of the Related Art

According to USB (Universal Serial Bus) standard (USB 3.0 standard, USB 2.0 standard, USB BC (Battery Charging) 1.2 standard, or the like) specified before USB Type-C standard, the power supply capability of a power transmitting apparatus is detectable by using D+ and D− terminals. In this specification, USB standard (USB 3.0 standard, USB 2.0 standard, USB BC (Battery Charging) 1.2 standard, or the like) which was specified before the USB Type-C standard will be referred to as a "legacy standard". Japanese Patent Laid-Open No. 2012-185661 discloses a method of detecting a current supplied from a host apparatus to a load in accordance with a method different from a method specified by a legacy standard.

In the USB Type-C standard, a USB Type-C connector has been newly specified. A CC (Configuration Channel) terminal that is not included in a connector conforming to a legacy standard has been added to the USB Type-C connector. According to the USB Type-C standard, a CC voltage (a voltage applied to the CC terminal) indicates whether the power supply capability of a power supply apparatus is one of three different power supply capabilities (Default USB, 7.5 W (1.5 A, 5 V), and 15 W (3 A, 5 V)). Default USB is a power supply capability specified by a legacy standard. 7.5 W (1.5 A, 5 V) and 15 W (3 A, 5 V) are power supply capabilities specified by the USB Type-C standard. Hence, a power receiving apparatus can detect, based on the detected CC voltage, the power supply capability of the power supply apparatus.

A USB Type-C cable that can connect a power supply apparatus conforming to the USB Type-C standard to a power receiving apparatus conforming to the USB Type-C standard includes USB Type-C connectors on both of its ends. On the other hand, a USB Type-C cable that can connect a power supply apparatus conforming to a legacy standard to the power receiving apparatus conforming to the USB Type-C standard includes, e.g., a Type A connector conforming to the USB 2.0 standard on one end and a USB Type-C connector on the other end. In this specification, the USB Type-C cable that can connect the power supply apparatus conforming to the legacy standard to the power receiving apparatus conforming to the USB Type-C standard will be referred to as a "legacy cable".

A connector conforming to a legacy standard does not include a CC terminal. Hence, a power supply apparatus conforming to the legacy standard cannot apply a voltage to the CC terminal of a power receiving apparatus. Hence, in the USB Type-C standard, in a case in which a legacy cable is to connect the power supply apparatus conforming to the legacy standard to a power receiving apparatus conforming to the USB Type-C standard, it is specified that the legacy cable will apply a voltage to the CC terminal of the power receiving apparatus. As a result, the power receiving apparatus is informed of the power supply capability of the power supply apparatus. However, according to the USB Type-C standard, the legacy cable can apply only a voltage indicating Default USB to the CC terminal of the power receiving apparatus.

However, there are inappropriate legacy cables that do not meet the USB Type-C standard available in the market. Hence, it is possible that a power supply apparatus and a power receiving apparatus will be connected to each other by such an inappropriate legacy cable. If a power supply apparatus and a power receiving apparatus are connected to each other by such an inappropriate legacy cable, the power receiving apparatus may detect the power supply capability of the power supply apparatus erroneously and may attempt, problematically, to receive power exceeding the power supply capability of the power supply apparatus. In this case, it is possible that the power receiving apparatus will stop its operation due to lack of power because it cannot receive sufficient power from the power supply apparatus.

SUMMARY

According to an aspect of the embodiments, one or a plurality of problems that occur when a power supply apparatus and a power receiving apparatus are connected via an inappropriate cable which does not meet the USB Type-C standard can be solved.

According to an aspect of the embodiments, there is provided an electronic device comprising: a power receiving unit that receives power from a power supply apparatus; a type determination unit that determines a type of the power supply apparatus; a capability determination unit that determines a power supply capability of the power supply apparatus; and a control unit that limits or stops power to be received from the power supply apparatus if the type of the power supply apparatus is determined to be a first type and the power supply capability of the power supply apparatus is determined to be a second power supply capability higher than a first power supply capability that corresponds to the first type.

According to an aspect of the embodiments, there is provided a control method of an electronic device comprising: determining a type of a power supply apparatus; determining a power supply capability of the power supply apparatus; and limiting or stopping power to be received from the power supply apparatus if the type of the power supply apparatus is determined to be a first type and the power supply capability of the power supply apparatus is determined to be a second power supply capability higher than a first power supply capability that corresponds to the first type.

According to an aspect of the embodiments, there is provided a non-transitory storage medium that stores a program causing a computer to execute a control method of an electronic device, the control method comprising: determining a type of a power supply apparatus; determining a power supply capability of the power supply apparatus; and limiting or stopping power to be received from the power supply apparatus if the type of the power supply apparatus is determined to be a first type and the power supply capability of the power supply apparatus is determined to be a second power supply capability higher than a first power supply capability that corresponds to the first type.

Further aspects of the embodiments will become apparent from the following embodiments.

BRIEF DESCRIPTION OF THE DRAWINGS

FIG. 5 is a flowchart for illustrating an example of an operation of a power receiving apparatus 100 according to the second embodiment; and FIG. 6 is a table for illustrating the relationship between the power supply capability of a power supply apparatus and a CC voltage.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1:
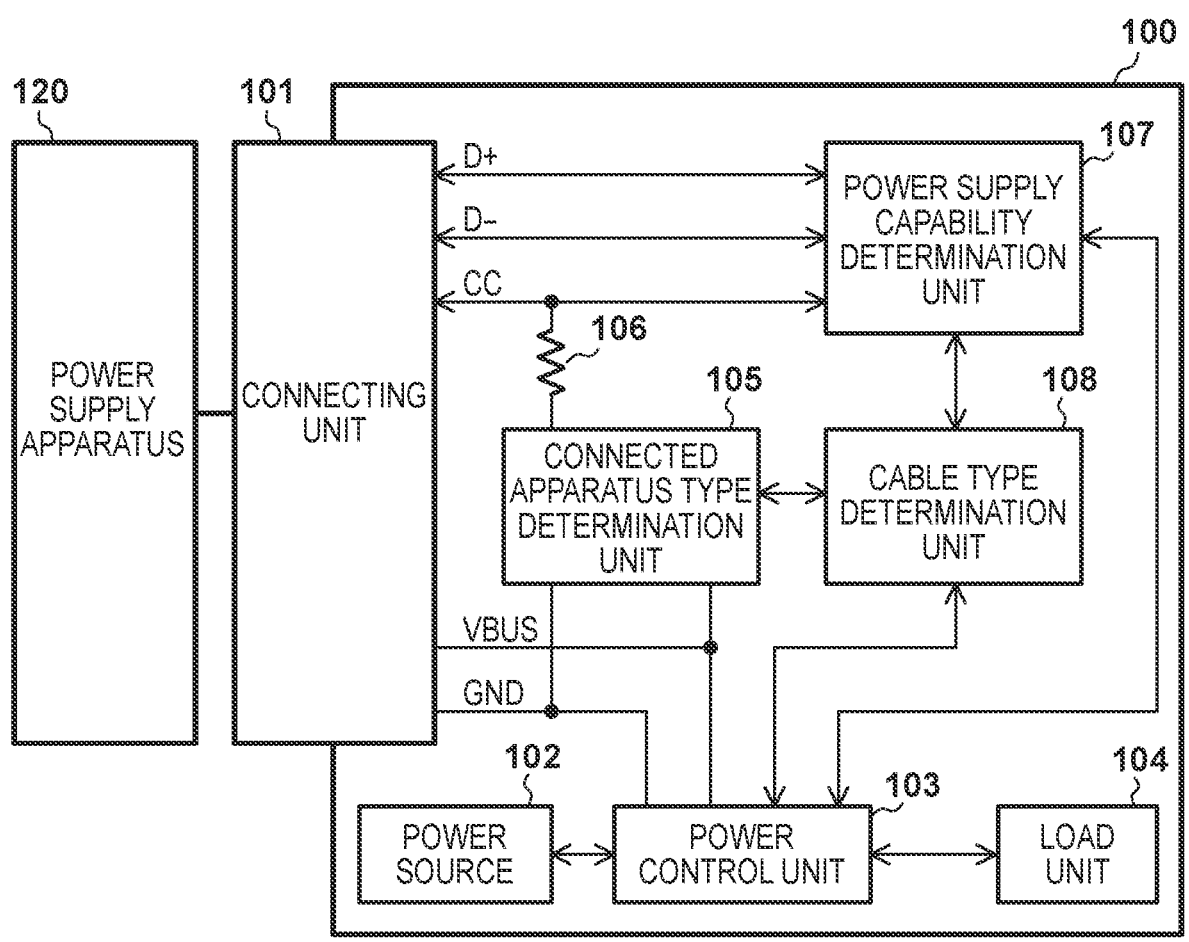
FIG. 1 is a block diagram for illustrating an example of components of a power receiving apparatus 100 according to the first embodiment.

FIG. 1 is a block diagram for illustrating an example of components of a power receiving apparatus 100 according to the first embodiment.

The power receiving apparatus 100 is an electronic device that can receive power supplied from a power supply apparatus 120 via a USB Type-C cable. The power supply apparatus 120 is an electronic device that can supply power to the power receiving apparatus 100 via the USB Type-C cable.

The power receiving apparatus 100 includes, as shown in FIG. 1, a connecting unit 101, a power source 102, a power control unit 103, a load unit 104, a connected apparatus type determination unit 105, a resistor 106, a power supply capability determination unit 107, and a cable type determination unit 108. However, the components included in the power receiving apparatus 100 are not limited to those shown in FIG. 1.

The connecting unit 101 is a connector (receptacle) conforming to USB Type-C standard. The power supply apparatus 120 is connected to the connecting unit 101 via a USB Type-C cable. The connecting unit 101 includes at least a VBUS terminal, a GND (ground) terminal, a CC (Configuration Channel) terminal, a D+ terminal, a D– terminal, or the like. Power supply from the power supply apparatus 120 to the power receiving apparatus 100 is performed via the VBUS terminal. A voltage indicating the power supply capability of the power supply apparatus 120 is applied to the CC terminal. Communication conforming to USB 2.0 standard is performed via the D+ terminal and the D– terminal. If the power supply apparatus 120 is an electronic device conforming to a legacy standard, the type of the power supply apparatus 120 is determined via the D+ terminal and the D– terminal. The GND (ground) terminal is connected to a ground line (first potential).

The power source 102 includes a chargeable battery (e.g., a lithium-ion battery). The power control unit 103 supplies power received from one or both of the power source 102 and the power supply apparatus 120 to components of the power receiving apparatus 100 (the load unit 104, the connected apparatus type determination unit 105, the power supply capability determination unit 107, the cable type determination unit 108, or the like). The power control unit 103 charges the power source 102 by using power received from the power supply apparatus 120 via the VBUS terminal of the connecting unit 101. The power control unit 103 controls the charging of the power source 102.

The power control unit 103 receives, from the power supply capability determination unit 107, information indicating the power supply capability of the power supply apparatus 120. The information indicating the power supply capability of the power supply apparatus 120 indicates whether the power supply capability of a power supply apparatus 120 is one of three different power supply capabilities (Default USB, 7.5 W (1.5 A, 5 V), and 15 W (3 A, 5 V)). The power control unit 103 can control power to be received (corresponding to power to be received by the power control unit 103 from the power supply apparatus 120 via the VBUS terminal of the connecting unit 101), based on this information so power to be received will not exceed the power supply capability of the power supply apparatus 120. Furthermore, the power control unit 103 receives, from the cable type determination unit 108, information indicating whether a legacy cable connected to the connecting unit 101 is an inappropriate cable which does not meet the USB Type-C standard. As a result, in a case in which the legacy cable connected to the connecting unit 101 is an inappropriate cable which does not meet the USB Type-C standard, the power control unit 103 can limit or stop receiving power (corresponding to power to be received by the power control unit 103 from the power supply apparatus 120 via the VBUS terminal of the connecting unit 101). In this manner, the power control unit 103 can function as a control unit that controls power to be received from the power supply apparatus 120 via the VBUS terminal of the connecting unit 101.

The load unit 104 is formed, for example, so as to provide to a user a function such as an image capturing apparatus (e.g., a digital camera), a mobile phone (e.g., a smartphone), or a mobile terminal (e.g., a tablet device). The load unit 104 operates based on power supplied from the power control unit 103.

The connected apparatus type determination unit 105 is connected between the resistor 106 and the GND-terminal of the connecting unit 101. The connected apparatus type determination unit 105 can generate connected apparatus type information indicating whether the power supply apparatus 120 connected to the connecting unit 101 via the USB Type-C cable is an apparatus conforming to a legacy standard, an apparatus conforming to the USB Type-C standard, or an unknown apparatus. The cable type determination unit 108 is notified of the connected apparatus type information generated by the connected apparatus type determination unit 105. Note that, as described above, a legacy standard indicates USB standard (USB 3.0 standard, USB 2.0 standard, USB BC (Battery Charging) 1.2 standard, or the like) that was specified before the USB Type-C standard. The connected apparatus type determination unit 105 is connected to the VBUS terminal of the connecting unit 101 and is capable of detecting the voltage applied to the VBUS terminal of the connecting unit 101. Components of the connected apparatus type determination unit 105 will be described later.

The resistor 106 is a pull-down resistance for pulling down the voltage of the CC terminal of the connecting unit 101 to a predetermined pull-down voltage. The predetermined pull-down voltage is a voltage specified by the USB Type-C standard. The resistor 106 has a predetermined resistance value specified by the USB Type-C standard. One end of the resistor 106 is connected to the CC terminal of the connecting unit 101. The other end of the resistor 106 is connected to the connected apparatus type determination unit 105.

The power supply capability determination unit 107 is connected to the CC terminal, the D+ terminal, and the D− terminal of the connecting unit 101. The power supply capability determination unit 107 detects a CC voltage which is a voltage applied to the CC terminal of the connecting unit 101. The power supply capability determination unit 107 detects, based on the detected CC voltage, which of the three different power supply capabilities (Default USB, 7.5 W (1.5 A, 5 V), and 15 W (3 A, 5 V)) is the power supply capability of the power supply apparatus 120. The relationship shown in FIG. 6 is used to determine which of the three different power supply capabilities (Default USB, 1.5 A/5 V, and 3 A/5 V) is the power supply capability of power supply apparatus 120. For example, in a case in which the CC voltage detected by the power supply capability determination unit 107 is 0.9 V, the power supply capability determination unit 107 will determine that the power supply capability of the power source 120 is 7.5 W (1.5 A, 5 V) (see FIG. 6). If it is determined that the power supply capability of the power supply apparatus 120 is Default USB, the power supply capability determination unit 107 will detect the power supply capability of the power supply apparatus 120 via the D+ and D− terminals in accordance with the USB BC 1.2 standard. In addition, the power supply capability determination unit 107 includes a decoder for decoding a BMC (Biphase Mark Coding) signal conforming to the USB PD (Power Delivery) standard. The power supply capability determination unit 107 can detect the power supply capability of the power supply apparatus 120 by decoding the data transferred to the CC terminal of the connecting unit 101 by the decoder. The power supply capability determination unit 107 can detect the power supply capability of the power supply apparatus 120 by executing predetermined communication using the CC terminal. The power supply capability determination unit 107 can notify the power control unit 103 and the cable type determination unit 108 of the information indicating the power supply capability of the power supply apparatus 120. In this manner, the power supply capability determination unit 107 can function as a power supply capability determination unit that detects the power supply capability of the power supply apparatus 120.

The cable type determination unit 108 obtains the connected apparatus type information of which it is notified from the connected apparatus type determination unit 105. The cable type determination unit 108 can determine whether the USB Type-C cable connected to the connecting unit 101 is a legacy cable based on this information. In addition, the cable type determination unit 108 obtains the information related to the power supply capability of the power supply apparatus 120 of which it is notified from the power supply capability determination unit 107. The cable type determination unit 108 can determine, based on this information, whether the legacy cable connected to the connecting unit 101 is an inappropriate cable which does not meet the USB Type-C standard.

Figure 3:
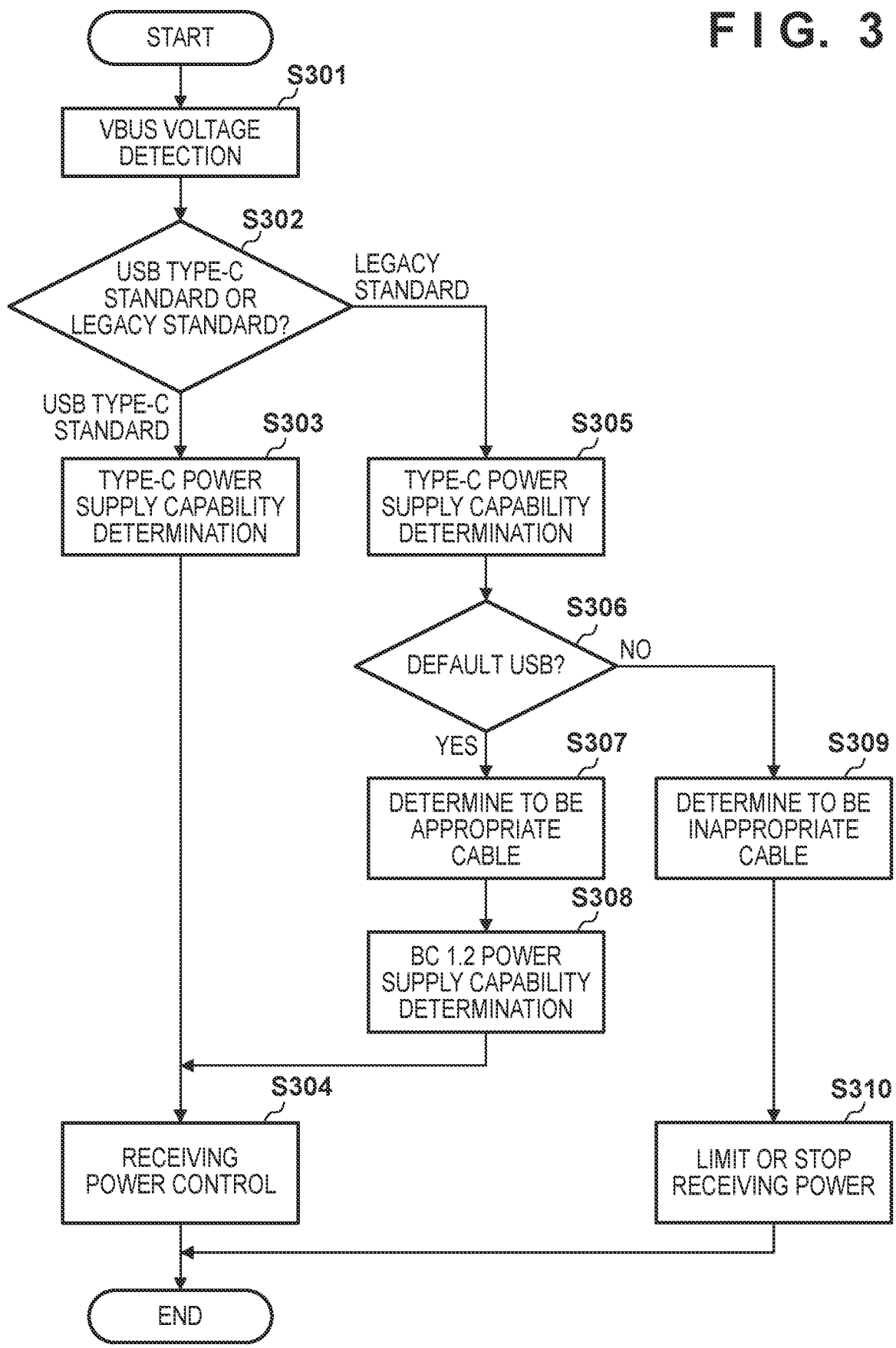
FIG. 3 is a flowchart for illustrating an example of an operation of the power receiving apparatus 100 according to the first embodiment.

An example of the operation of the power receiving apparatus 100 according to the first embodiment will be described next with reference to the flowchart of FIG. 3. FIG. 3 shows an example of an operation performed when the power supply apparatus 120 is connected to the connecting unit 101 of the power receiving apparatus 100 via a USB Type-C cable.

In the initial state (a state before the power supply apparatus 120 is connected to the connecting unit 101 via the USB Type-C cable), a switch 202 of the connected apparatus type determination unit 105 is in a conduction state. Hence, the voltage of the CC terminal of the connecting unit 101 is pulled down to a predetermined pull-down voltage by the resistor 106. The process of step S301 is started when the power supply apparatus 120 is connected to the connecting unit 101 via the USB Type-C cable. In step S301, the connected apparatus type determination unit 105 detects a VBUS voltage (a voltage applied to the VBUS terminal of the connecting unit 101). Subsequently, the process of step S302 is started.

In step S302, the connected apparatus type determination unit 105 performs connected apparatus type determination processing (see FIG. 4) (to be described later). By performing the connected apparatus type determination processing (to be described later), the connected apparatus type determination unit 105 can determine whether the power supply apparatus 120 (corresponding to the connected apparatus) is an apparatus conforming to the USB Type-C standard, an apparatus conforming to a legacy standard, or an unknown apparatus. Note that, although it is not shown in FIG. 3, if it is determined in step S302 that the power supply apparatus 120 is an unknown apparatus, the power control unit 103 will limit or stop receiving power (corresponding to power to be received by the power control unit 103 from the power supply apparatus 120 via the VBUS terminal of the connecting unit 101). If receiving power is to be limited, the power control unit 103 will limit the current to be received from the power supply apparatus 120, for example, to be equal to or lower than 2.5 mA.

If it is determined in step S302 that the power supply apparatus 120 is an apparatus conforming to the USB Type-C standard, the process of step S303 is started. In step S303, the cable type determination unit 108 determines that the USB Type-C cable connected to the connecting unit 101 is not a legacy cable. A legacy cable is, as described above, a USB Type-C cable that can connect a power supply apparatus conforming to a legacy standard to a power receiving apparatus conforming to the USB Type-C standard. The power supply apparatus 120 will supply a voltage to the CC terminal of the connecting unit 101 in a case in which the USB Type-C cable connected to the connecting unit 101 is not the legacy cable. Therefore, the CC voltage (the voltage applied to the CC terminal of the connecting unit 101) can be used to determine which of the three different power supply capabilities (Default USB, 1.5 A/5 V, or 3 A/5 V) is the power supply capability of the power supply apparatus 120. Thus, the power supply capability determination unit 107 detects the CC voltage and determines the power supply capability of the power supply apparatus 120 based on the detected CC voltage. After the power supply capability determination unit 107 has determined the power supply capability of the power supply apparatus 120, the process of step S304 (to be described later) is started.

If it is determined in step S302 that the power supply apparatus 120 is an apparatus conforming to a legacy standard, the process of step S305 is started. In step S305, the cable type determination unit 108 determines, based on the determination result of the connected apparatus type determination unit 105, that the power supply apparatus 120 is connected to the connecting unit 101 via a legacy cable. Note that, as described above, a USB Type-C cable that can connect a power supply apparatus conforming to a legacy standard to a power receiving apparatus conforming to the USB Type-C standard. In step S305, the power supply capability determination unit 107 detects the CC voltage (the voltage applied to the CC terminal of the connecting unit 101) and determines the power supply capability of the power supply apparatus 120 based on the detected CC voltage. For example, as shown in FIG. 6, in a case in which the CC voltage is equal to or higher than 0.25 V but lower than 0.66 V, the power supply capability determination unit 107 will determine that the power supply capability of the power supply apparatus 120 is Default USB. Note that in a case in which the power supply apparatus 120 is an apparatus conforming to a legacy standard, the CC voltage is supplied by the legacy cable instead of the power supply apparatus 120. After the power supply capability of the power supply apparatus 120 is determined, the process of step S306 is started.

In step S306, the cable type determination unit 108 determines whether the power supply capability of the power supply apparatus 120 determined in step S305 is Default USB.

According to the USB Type-C standard, only the Default USB is allowed to be informed to the power receiving apparatus as the power supply capability by a legacy cable. Hence, if it is determined in step S305 that the power supply capability of the power supply apparatus 120 is Default USB, the cable type determination unit 108 will determine (step S307) that the legacy cable connected to the connecting unit 101 is an appropriate cable that meets the USB Type-C standard. In a case in which the power supply capability of the power supply apparatus 120 determined in step S305 is Default USB, it is specified in the USB Type-C standard that the power receiving apparatus 100 will receive power in accordance with the legacy standard via the VBUS terminal of the connecting unit 101. Thus, in the first embodiment, the power supply capability determination unit 107 will determine the power supply capability of the power supply apparatus 120 in accordance with the USB BC 1.2 standard (step S308). After the power supply capability of the power supply apparatus 120 is determined in accordance with the USB BC 1.2 standard, the process of step S304 is started.

In step S304, the power control unit 103 determines power to be received (corresponding to power to be received by the power control unit 103 from the power supply apparatus 120 via the VBUS terminal of the connecting unit 101) so the power to be received will not exceed the power supply capability of the power supply apparatus 120 determined in step S303 or step S308. The power control unit 103 starts the power receiving operation so as to receive, from the power supply apparatus 120, power equal to or lower than the power determined in step S304.

A case in which the power supply capability of the power supply apparatus 120 determined in step S305 is not Default USB (NO in step S306) means that the legacy cable connected to the connecting unit 101 has informed the power receiving apparatus 100 of a power supply capability other than the Default USB. A state in which the legacy cable informs the power receiving apparatus of a power supply capability other than the Default USB is a state that departs from the USB Type-C standard. Hence, in step S309, the cable type determination unit 108 will determine that the legacy cable connected to the connecting unit 101 is an inappropriate cable which does not meet the USB Type-C standard. In case in which the power receiving apparatus is informed of a power supply capability from such an inappropriate cable by using the CC voltage, it is possible that the power supply capability will exceed the power supply capability of the power supply apparatus 120. In order to prevent the power receiving apparatus from receiving, from the power supply apparatus 120, a current exceeding the power supply capability of the power supply apparatus 120, the process of step S310 is started.

In step S310, based on the determination result of the cable type determination unit 108, the power control unit 103 limits or stops receiving power (corresponding to power to be received by the power control unit 103 from the power supply apparatus 120 via the VBUS terminal of the connecting unit 101). If receiving power is to be limited, the power control unit 103 limits, for example, a current to be received from the power supply apparatus 120 to be equal to or lower than 2.5 mA.

In this manner, the power receiving apparatus 100 according to the first embodiment can appropriately determine the power supply capability of the power supply apparatus 120 by determining whether the cable connected to the connecting unit 101 is an inappropriate cable which does not meet the USB Type-C standard. The power receiving apparatus 100 can cause the load unit 104 to operate in accordance with the power supply capability of the power supply apparatus 120, and charge the power source 102 in accordance with the power supply capability of the power supply apparatus 120. The power receiving apparatus 100 can appropriately determine the power supply capability of the power supply apparatus 120 and can receive, from the power supply apparatus 120, a current suited to the power supply capability of the power supply apparatus 120. Thus, the power receiving apparatus 100 can prevent the occurrence of a state in which the load unit 104 becomes incapable of operating due to lack of power from the power supply apparatus 120.

Figure 2:
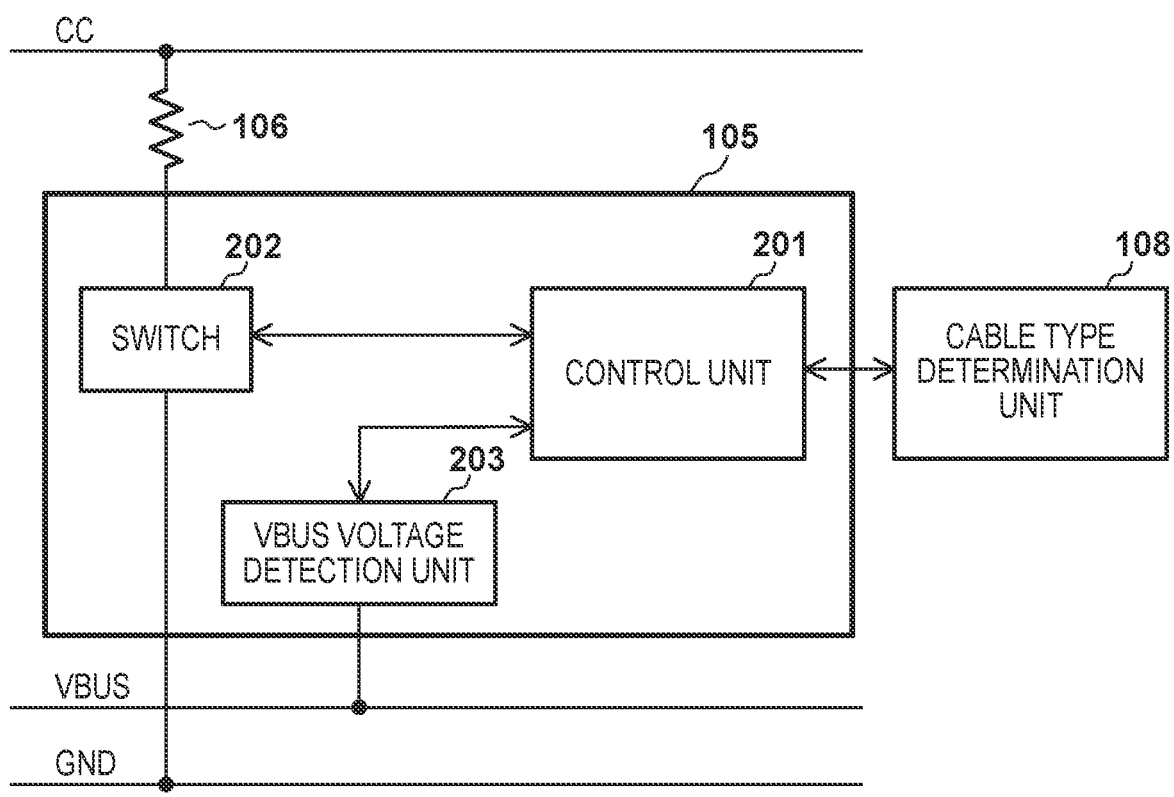
FIG. 2 is a block diagram for illustrating an example of components of a connected apparatus type determination unit 105.

An example of components of the connected apparatus type determination unit 105 will be described next with reference to FIG. 2. The connected apparatus type determination unit 105 includes, as shown in FIG. 2, a control unit 201, the switch 202, and a VBUS voltage detection unit 203. Note that these components are merely examples of components included in the connected apparatus type determination unit 105.

The switch 202 is arranged between the resistor 106 and the GND-terminal of the connecting unit 101. The switch 202 can set the resistor 106 and the GND-terminal in the conduction state and the non-conduction state under the control of the control unit 201. Note that in the initial state of the switch 202, that is, in a state in which the switch 202 is not under the control of the control unit 201, the switch 202 is in the conduction state. The switch 202 is formed by, for example, a p-channel FET (Field Effect Transistor). In a case in which the switch 202 is formed by a p-channel FET, the drain of the p-channel FET will be connected to the GND-terminal of the connecting unit 101, and the source of the p-channel FET will be connected to the resistor 106. A high-level signal or a low-level signal is supplied from the control unit 201 to the gate of the p-channel FET. If a voltage is applied to the CC terminal in a state in which the gate of the p-channel FET is low level, the switch 202 is set to the conduction state. A depletion mode FET, a Junction FET, or the like may be used as the switch 202 so that the switch 202 will be set to the conduction state even in a case in which the CC voltage is low, for example, in a case in which the CC voltage is 0.25 V. Although the switch 202 is arranged between the resistor 106 and the GND-terminal in the first embodiment, the first embodiment is not limited to this. The switch 202 suffices to be capable of switching whether to connect the resistor 106 as a load to the CC terminal of the connecting unit 101. Hence, the switch 202 may be arranged between the CC terminal and the resistor 106.

The VBUS voltage detection unit 203 detects the VBUS voltage (the voltage applied to the VBUS terminal of the connecting unit 101). The VBUS voltage detection unit 203 notifies the control unit 201 of the VBUS voltage information which indicates the VBUS voltage detected by the VBUS voltage detection unit 203. The control unit 201 can determine, by the connected apparatus type determination processing (to be described later), whether the power supply apparatus 120 connected to the connecting unit 101 via the USB Type-C cable is an apparatus conforming to the USB Type-C standard, an apparatus conforming to a legacy standard, or an unknown apparatus. The control unit 201 can obtain the VBUS voltage information from the VBUS voltage detection unit 203. In addition, the control unit 201 can notify the cable type determination unit 108 of the connected apparatus type information obtained by the connected apparatus type determination processing.

An example of the connected apparatus type determination processing performed by the connected apparatus type determination unit 105 in step S302 will be described next with reference to the flowchart of FIG. 4.

In step S401, the control unit 201 sets the switch 202 to the non-conduction state. When the switch 202 is set to the non-conduction state, the voltage of the CC terminal of the connecting unit 101 is set to a voltage which was set before the voltage was pulled down to the predetermined pull-down voltage by the resistor 106. In a case in which the power supply apparatus 120 is a power supply apparatus conforming to the USB Type-C standard, the power supply apparatus 120 will stop applying a voltage to the VBUS terminal when the voltage of the CC terminal of the connecting unit 101 is changed to the voltage set before the voltage was pulled down to the predetermined pull-down voltage by the resistor 106. On the other hand, in a case in which the power supply apparatus 120 is a power supply apparatus conforming to a legacy standard, the power supply apparatus 120 will continue to apply the voltage to the VBUS terminal even when the voltage of the CC terminal of the connecting unit 101 is changed to the voltage set before the voltage was pulled down to the predetermined pull-down voltage by the resistor 106.

After the switch 202 is set to the non-conduction state in step S401, the process of step S402 is started. In step S402, the control unit 201 refers to the VBUS voltage information of which it was notified from the VBUS voltage detection unit 203, and determines whether the VBUS voltage detected by the VBUS voltage detection unit 203 is equal to or less than a first value. The first value is, for example, 0.8 V which is the voltage at which it will be determined that the output of the VBUS voltage has stopped in the USB PD standard. If it is determined that the detected VBUS voltage is equal to or less than the first value (YES in step S402), the control unit 201 causes the process to advance to step S403. If it is determined that the detected VBUS voltage exceeds the first value (NO in step S402), the control unit 201 causes the process to advance to step S404.

In step S403, the control unit 201 determines that the power supply apparatus 120 is a power supply apparatus conforming to the USB Type-C standard. Subsequently, the control unit 201 notifies the cable type determination unit 108 of the connected apparatus type information which indicates that the power supply apparatus 120 is a power supply apparatus conforming to the USB Type-C standard, and the process advances to step S408.

In step S404, the control unit 201 refers to the VBUS voltage information described above, and determines whether the VBUS voltage detected by the VBUS voltage detection unit 203 falls within a predetermined range. Assume that the predetermined range is, for example, from 4.75 V to 5.25 V. If it is determined that the detected VBUS voltage falls within the predetermined range (YES in step S404), the control unit 201 will cause the process to advance to step S405. If it is determined that the detected VBUS voltage does not fall within the predetermined range (NO in step S404), the control unit 201 causes the process to advance to step S406.

In step S405, the control unit 201 determines that the power supply apparatus 120 is a power supply apparatus conforming to the legacy standard. Subsequently, the control unit 201 notifies the cable type determination unit 108 of the connected apparatus type information which indicates that the power supply apparatus 120 is a power supply apparatus conforming to the legacy standard, and the process advances to step S408.

In step S406, the control unit 201 determines whether the retry count of the process of step S404 is equal to or more than a predetermined count. Assume that the predetermined count is, for example, any number from 2 to 20. If it is determined that the retry count of the process of step S404 is equal to or more than the predetermined count (YES in step S406), the control unit 201 causes the process to advance to step S407. If it is determined that the retry count of the process of step S404 is less than the predetermined count (NO in step S406), the control unit 201 causes the process to return to step S404.

In step S407, the control unit 201 determines that the power supply apparatus 120 is an unknown apparatus. Subsequently, the control unit 201 notifies the cable type determination unit 108 of the connected apparatus type information which indicates that the power supply apparatus 120 is an unknown apparatus, and the process advances to step S408.

In step S408, the control unit 201 sets the switch 202 to the conduction state. After the switch 202 is set to the conduction state in step S408, the processing of the operation example shown in FIG. 4 ends.

Figure 4:
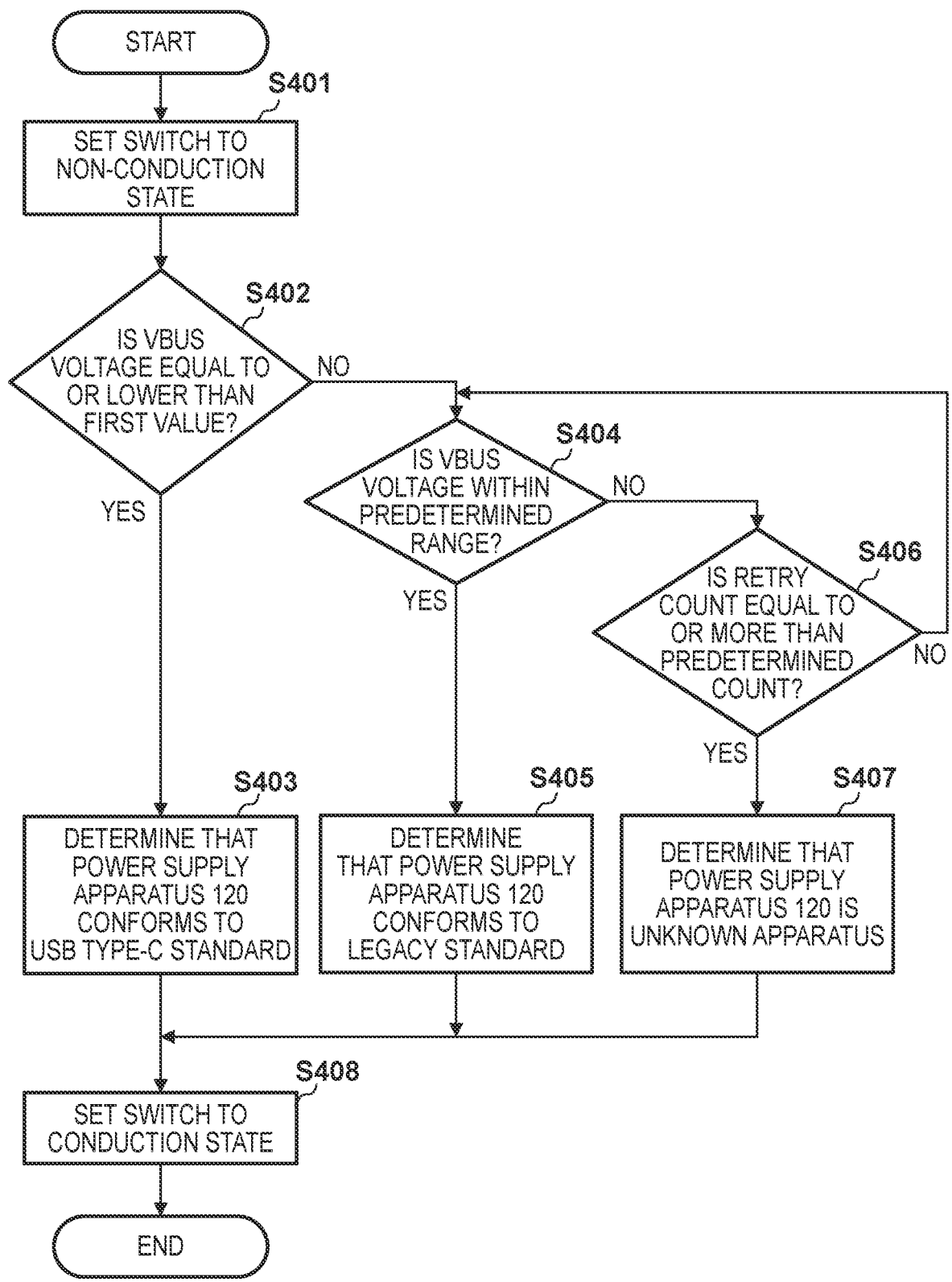
FIG. 4 is a flowchart for illustrating an example of an operation of the connected apparatus type determination unit 105.

Note that the connected apparatus type determination unit 105 suffices to be able to detect whether the power supply apparatus 120 is an apparatus conforming to the USB Type-C standard, an apparatus conforming to a legacy standard, or an unknown apparatus, and the connected apparatus type determination unit is not limited to the arrangement shown in FIG. 2 or the operation example shown in FIG. 4.

In this manner, according to the first embodiment, in a case in which it is detected that the power supply capability of the power supply apparatus 120 is not Default USB even though it has been detected that the power supply apparatus 120 is an apparatus conforming to the legacy standard, receiving power (corresponding to power to be received by the power control unit 103 from the power supply apparatus 120 via the VBUS terminal of the connecting unit 101) is limited or stopped. Hence, according to the first embodiment, it is possible to prevent the power receiving apparatus 100 from attempting to receive power that exceeds the power supply capability of the power supply apparatus 120. Therefore, according to the first embodiment, it is possible to provide an electronic device that can receive power appropriately from the power supply apparatus 120.

Note that the embodiments of the disclosure are not limited to the first embodiment as described above. The embodiments of the disclosure include the first embodiment that has been changed or modified without departing from the scope of the disclosure.

Second Embodiment

An electronic device and a control method thereof according to the second embodiment will be described next.

The first embodiment described an example in which the power supply capability of the power supply apparatus 120 is determined after whether the power supply apparatus 120 is an apparatus conforming to the USB Type-C standard, an apparatus conforming to a legacy standard, or an unknown apparatus. It is also possible to switch the order of the determination of the connected apparatus type and the determination of the power supply capability of the power supply apparatus 120 and perform the determination operations in the switched order. Hence, the second embodiment will describe an example in which whether a power supply apparatus 120 is an apparatus conforming to the USB Type-C standard, an apparatus conforming to a legacy standard, or an unknown apparatus is determined after the power supply capability of the power supply apparatus 120 has been determined. In addition, the second embodiment will describe an example in which determination as to whether the power supply apparatus 120 is connected to a power receiving apparatus via an appropriate cable that meets the USB Type-C standard is performed after the determination of the connected apparatus type. In the second embodiment, it is possible to achieve the same effects as those of the first embodiment by performing fewer processes.

Components of a power receiving apparatus 100 according to the second embodiment are the same as those of the power receiving apparatus 100 according to the first embodiment, thus a description will be omitted.

An example of the operation of the power receiving apparatus 100 according to the second embodiment will be described next with reference to the flowchart of FIG. 5. FIG. 5 shows an example of an operation performed when the power supply apparatus 120 is connected to a connecting unit 101 of the power receiving apparatus 100 via a USB Type-C cable according to the second embodiment.

In the initial state (a state before the power supply apparatus 120 is connected to the connecting unit 101 via the USB Type-C cable), a switch 202 of a connected apparatus type determination unit 105 is in a conduction state. Hence, the voltage of a CC terminal of the connecting unit 101 is pulled down to a predetermined pull-down voltage by a resistor 106. The process of step S501 is started when the power supply apparatus 120 is connected to the connecting unit 101 via the USB Type-C cable. In step S501, the connected apparatus type determination unit 105 detects (step S501) a VBUS voltage (a voltage applied to the VBUS terminal of the connecting unit 101). Subsequently, the process of step S502 is started.

In step S502, a power supply capability determination unit 107 detects a CC voltage (a voltage applied to the CC terminal of the connecting unit 101) and determines the power supply capability of the power supply apparatus 120 (corresponding to a connected apparatus) based on the detected CC voltage. If it is determined that the power supply capability of the power supply apparatus 120 is Default USB (YES in step S503), the process of step S504 is started. If it is determined that the power supply capability of the power supply apparatus 120 is not the Default USB (NO in step S503), the process of step S506 is started.

In step S504, the power supply capability determination unit 107 determines the power supply capability of the power supply apparatus 120 in accordance with the USB BC 1.2 standard. After the power supply capability of the power supply apparatus 120 is determined, the process of step S505 (to be described later) is started.

In step S506, the connected apparatus type determination unit 105 performs connected apparatus type determination processing (see FIG. 4) described above. By performing the connected apparatus type determination processing, the connected apparatus type determination unit 105 can determine whether the power supply apparatus 120 is an apparatus conforming to the USB Type-C standard, an apparatus conforming to a legacy standard, or an unknown apparatus. Note that, although it is not shown in FIG. 5, if it is determined that the power supply apparatus 120 is an unknown apparatus, a power control unit 103 will limit or stop receiving power (corresponding to power to be received by the power control unit 103 from the power supply apparatus 120 via the VBUS terminal of the connecting unit 101). If receiving power is to be limited, the power control unit 103 will limit the current to be received from the power supply apparatus 120 to be, for example, equal to or lower than 2.5 mA.

Note that since the switch 202 will be temporarily set to a non-conduction state in the connected apparatus type determination processing described above, there is a possibility that the power supply capability of the power supply apparatus which conforms to the USB Type-C standard will change before/after the execution of the connected apparatus type determination processing. Hence, in a case in which the power supply apparatus 120 is an apparatus conforming to the USB Type-C standard, the process of step S507 is started. In step S507, the power supply capability determination unit 107 detects the CC voltage (the voltage applied to the CC terminal of the connecting unit 101) and determines the power supply capability of the power supply apparatus 120 based on the detected CC voltage again. Note that in a case in which the power supply apparatus 120 is an apparatus conforming to the USB Type-C standard, the CC voltage is supplied by the power supply apparatus 120, and the power receiving apparatus 100 will be informed of the power supply capability of the power supply apparatus 120 by this CC voltage. After the power supply capability of the power supply apparatus 120 is determined, the process of step S505 is started.

In step S505, the power control unit 103 determines power to be received (corresponding to power to be received by the power control unit 103 from the power supply apparatus 120 via the VBUS terminal of the connecting unit 101) so the power to be received will not exceed the power supply capability of the power supply apparatus 120 determined in step S504 or step S507. The power control unit 103 starts the power receiving operation so as to receive, from the power supply apparatus 120, power equal to or lower than the power determined in step S505.

If it is determined in step S506 that the power supply apparatus 120 is an apparatus conforming to a legacy standard, the process of step S508 is started. In step S508, a cable type determination unit 108 determines that the USB Type-C cable connected to the connecting unit 101 is a legacy cable. The CC voltage is a voltage supplied by the legacy cable instead of the power supply apparatus 120. The power receiving apparatus 100 is informed of the power supply capability of the power supply apparatus 120 by this CC voltage. However, a state in which the legacy cable informs the power receiving apparatus of a power supply capability other than the Default USB is a state which departs from the USB Type-C standard. Hence, in step S508, the cable type determination unit 108 will determine that the legacy cable connected to the connecting unit 101 is an inappropriate cable which does not meet the USB Type-C standard. In case in which the power receiving apparatus is informed of a power supply capability from such an inappropriate cable by using the CC voltage, it is possible that the power supply capability will exceed the power supply capability of the power supply apparatus 120. In order to prevent the power receiving apparatus from receiving, from the power supply apparatus 120, a current exceeding the power supply capability of the power supply apparatus 120, the process of step S509 is started.

In step S509, based on the determination result of the cable type determination unit 108, the power control unit 103 limits or stops receiving power (corresponding to power to be received by the power control unit 103 from the power supply apparatus 120 via the VBUS terminal of the connecting unit 101). If receiving power is to be limited, the power control unit 103 limits, for example, a current to be received from the power supply apparatus 120 to be equal to or lower than 2.5 mA.

In this manner, in the power receiving apparatus 100 according to the second embodiment, whether a power supply apparatus 120 is an apparatus conforming to the USB Type-C standard, an apparatus conforming to a legacy standard, or an unknown apparatus is determined after the power supply capability of the power supply apparatus 120 has been determined. Subsequently, in the second embodiment, it is determined whether the power supply apparatus 120 is connected to the power receiving apparatus via an appropriate cable which meets the USB Type-C standard. As a result, according to the second embodiment, the same effects as those of the first embodiment can be achieved by a method different from that of the first embodiment.

Note that the embodiments of the disclosure are not limited to the second embodiment as described above. The embodiments of the disclosure include the second embodiment that has been changed or modified without departing from the scope of the disclosure.

Third Embodiment

Various kinds of functions, processes, or methods described in the first and second embodiments can be implemented by a personal computer, a microcomputer, a CPU (Central Processing Unit), a processor, or the like by using corresponding programs. In the third embodiment, a personal computer, a microcomputer, a CPU (Central Processing Unit), a processor, or the like will be referred to as a "computer X" hereinafter. Also, in the third embodiment, a program for controlling the computer X, that is, a program for implementing one of the various kinds of functions, processes, or methods described in the first and second embodiments will be referred to as a "program Y".

Each of the various kinds of functions, processes, or methods described in the first and second embodiments is implemented by the computer X executing the program Y. In this case, the program Y is supplied to the computer X via a computer-readable storage medium. The computer-readable storage medium according to the third embodiment includes at least one of a hard disk device, a magnetic storage device, an optical storage device, a magneto-optical storage device, a memory card, a volatile memory, a non-volatile memory, or the like. The computer-readable storage medium according to the third embodiment is a non-transitory storage medium.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2017-254577, filed on Dec. 28, 2017, which is hereby incorporated by reference herein in its entirety.

What is claimed is:

1. An electronic device comprising:
   a first determination circuitry that determines whether a power supply apparatus is a first apparatus conforming to USB (Universal Serial Bus) Type-C standard or a second apparatus conforming to another USB standard older than the USB Type-C standard;
   a second determination circuitry that determines a power supply capability of the power supply apparatus by using a CC (configuration channel) terminal; and
   a control circuitry that limits or stops power to be received from the power supply apparatus via a VBUS terminal, in a case where the power supply apparatus is determined to be the second apparatus and the power supply capability of the power supply apparatus is determined to be a power supply capability specified by the USB Type-C standard and not specified by said another USB standard,
   wherein the first determination circuitry determines whether the power supply apparatus is the first apparatus or the second apparatus based on a voltage of the VBUS terminal in a state in which a voltage of the CC terminal is not a predetermined voltage.

2. The electronic device according to claim 1, wherein in a case where the power supply apparatus is determined to be the first apparatus, the second determination circuitry determines the power supply capability of the power supply apparatus based on a voltage of the CC terminal.

3. The electronic device according to claim 1, wherein the second determination circuitry determines the power supply capability of the power supply apparatus after the first determination circuitry determines whether the power supply apparatus is the first apparatus or the second apparatus.

4. The electronic device according to claim 1, wherein the first determination circuitry determines whether the power supply apparatus is the first apparatus or the second apparatus after the second determination circuitry determines the power supply capability of the power supply apparatus.

5. The electronic device according to claim 1, further comprising a connecting circuitry conforming to the USB Type-C standard, wherein the connecting circuitry includes the VBUS terminal and the CC terminal.

6. The electronic device according to claim 1, wherein in a case where the power supply apparatus is determined to be the first apparatus, the control circuitry controls power to be received from the power supply apparatus via the VBUS terminal based on the power supply capability of the power supply apparatus.

7. The electronic device according to claim 1, further comprising:
   a third determination circuitry that determines that a cable connected to the power supply apparatus is an inappropriate cable, in the case where the power supply apparatus is determined to be the second apparatus and the power supply capability of the power supply apparatus is determined to be a power supply capability specified by the USB Type-C standard and not specified by said another USB standard,
wherein power to be received from the power supply apparatus via the cable connected to the power supply apparatus is limits or stopped, in a case where the cable connected to the power supply apparatus is determined to be the inappropriate cable.

8. The electronic device according to claim 1, wherein the predetermined voltage corresponds to a voltage of a ground terminal.

9. The electronic device according to claim 1, wherein the first determination circuitry also determines whether the power supply apparatus is an unknown apparatus, and
wherein the control circuitry limits or stops power to be received from the power supply apparatus via the VBUS terminal, in a case where the power supply apparatus is determined to be the unknown apparats.

10. The electronic device according to claim 1, wherein said another USB standard includes USB 3.0 standard, USB 2.0 standard, or USB Battery Charging 1.2 standard.

11. A method comprising:
determining whether a power supply apparatus is a first apparatus conforming to USB (Universal Serial Bus) Type-C standard or a second apparatus conforming to another USB standard older than the USB Type-C standard;
determining a power supply capability of the power supply apparatus by using a CC (configuration channel) terminal; and
limiting or stopping power to be received from the power supply apparatus via a VBUS terminal, in a case where the power supply apparatus is determined to be the second apparatus and the power supply capability of the power supply apparatus is determined to be a power supply capability specified by the USB Type-C standard and not specified by said another USB standard,
wherein the power supply apparatus is determined to be the first apparatus or the second apparatus based on a voltage of the VBUS terminal in a state in which a voltage of the CC terminal is not a predetermined voltage.

12. The method according to claim 11, wherein in a case where the power supply apparatus is determined to be the first apparatus, the power supply capability of the power supply apparatus is determined based on a voltage of the CC terminal.

13. The method according to claim 11, wherein the power supply capability of the power supply apparatus is determined after a process of determining whether the power supply apparatus is the first apparatus or the second apparatus.

14. The method according to claim 11, wherein the power supply apparatus is determined to be the first apparatus or the second apparatus after a process of determining the power supply capability of the power supply apparatus.

15. The method according to claim 11, wherein in a case where the power supply apparatus is determined to be the first apparatus, power to be received from the power supply apparatus via the VBUS terminal is controlled based on the power supply capability of the power supply apparatus.

16. The method according to claim 11, further comprising:
determining that a cable connected to the power supply apparatus is an inappropriate cable, in the case where the power supply apparatus is determined to be the second apparatus and the power supply capability of the power supply apparatus is determined to be a power supply capability specified by the USB Type-C standard and not specified by said another USB standard,
wherein power to be received from the power supply apparatus via the cable connected to the power supply apparatus is limits or stopped, in a case where the cable connected to the power supply apparatus is determined to be the inappropriate cable.

17. The method according to claim 11, wherein the predetermined voltage corresponds to a voltage of a ground terminal.

18. The method according to claim 11, further comprising:
determining whether the power supply apparatus is an unknown apparatus; and
limiting or stopping power to be received from the power supply apparatus via the VBUS terminal, in a case where the power supply apparatus is determined to be the unknown apparatus.

19. The method according to claim 11, wherein said another USB standard includes USB 3.0 standard, USB 2.0 standard, or USB Battery Charging 1.2 standard.

20. A non-transitory storage medium that stores a program causing a computer to execute a method, the method comprising:
determining whether a power supply apparatus is a first apparatus conforming to USB (Universal Serial Bus) Type-C standard or a second apparatus conforming to another USB standard older than the USB Type-C standard;
determining a power supply capability of the power supply apparatus by using a CC (configuration channel) terminal; and
limiting or stopping power to be received from the power supply apparatus via a VBUS terminal, in a case where the power supply apparatus is determined to be the second apparatus and the power supply capability of the power supply apparatus is determined to be a power supply capability specified by the USB Type-C standard and not specified by said another USB standard,
wherein the power supply apparatus is determined to be the first apparatus or the second apparatus based on a voltage of the VBUS terminal in a state in which a voltage of the CC terminal is not a predetermined voltage.

* * * * *